United States Patent
Kim et al.

(10) Patent No.: US 6,948,229 B2
(45) Date of Patent: Sep. 27, 2005

(54) MANUFACTURING METHOD OF VARIABLE TUMBLE FLOW-GENERATING INTAKE PORT

(75) Inventors: Gyu-Hwan Kim, Suwon (KR); Gyu-Han Hwang, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/846,553

(22) Filed: May 17, 2004

(65) Prior Publication Data

US 2004/0211390 A1 Oct. 28, 2004

Related U.S. Application Data

(62) Division of application No. 10/025,584, filed on Dec. 26, 2001.

(30) Foreign Application Priority Data

| Dec. 27, 2000 | (KR) | 2000-82457 |
| Dec. 27, 2000 | (KR) | 2000-82458 |

(51) Int. Cl.⁷ ............................................. B21B 1/46
(52) U.S. Cl. ...................................... 29/527.5; 29/530
(58) Field of Search ........................ 29/527.5, 530, 29/890.127, 890.126, 469; 123/308, 306, 188.14, 432

(56) References Cited

U.S. PATENT DOCUMENTS

2004/0118379 A1 * 6/2004 Harui .......................... 123/432

FOREIGN PATENT DOCUMENTS

JP 406304696 * 11/1994

* cited by examiner

*Primary Examiner*—John C. Hong
(74) *Attorney, Agent, or Firm*—Antonelli, Terry, Stout & Kraus, LLP

(57) ABSTRACT

The present invention relates to a variable tumble flow-generating device, which comprises: a bulkhead for dividing an intake port into a first passage and a second passage; an opening degree control valve for selectively changing an opening degree of the first and second passages; and driving means for operating the opening angle control valve. This variable tumble flow-generating device can generate tumble flow by making air flowing through different passages while minimizing a flow resistance of air supplied into the combustion chamber, and which has a simple structure so that a limitation in its installation space in relation with other parts can be avoid. Also, the variable tumble flow-generating device is manufactured by adding only a structure where the bulkhead is previously assembled with the intake port core of the prior art. For this reason, this is a simple structure and thus is manufactured at inexpensive costs.

10 Claims, 12 Drawing Sheets

Fig.7
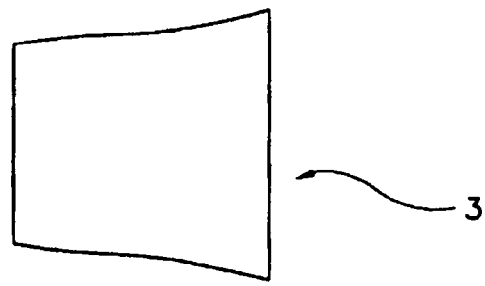
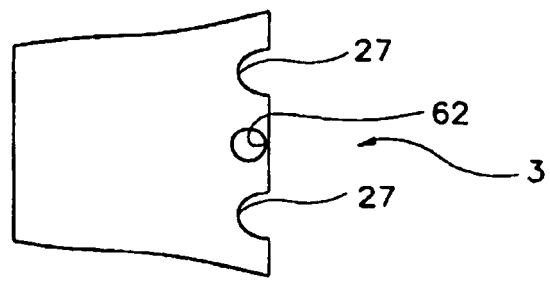
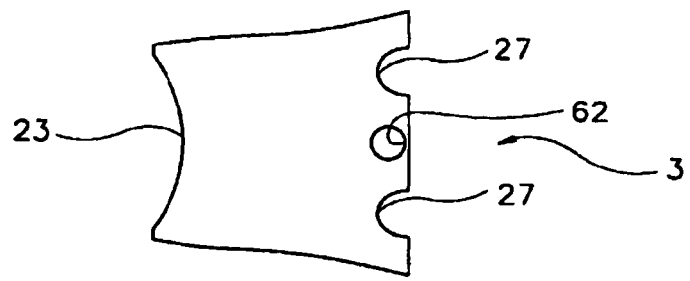
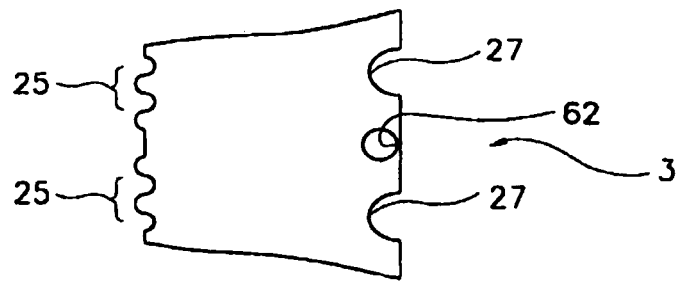

MANUFACTURING METHOD OF VARIABLE TUMBLE FLOW-GENERATING INTAKE PORT

CROSS REFERENCE TO RELATED APPLICATION

This is a divisional of U.S. Ser. No. 10/025,584, filed Dec. 26, 2001, entitled "Variable Tumble Flow-Generating Device of Engine Manufacturing Method of Variable Tumble Flow-Generating Intake Port which is incorporated herein by reference in its entirety.

BACKGROUND OF THE INVENTION

1. Field of the Invention

The present invention relates to a device for improving fluidity of intake air entering a combustion chamber of an engine, and a manufacturing method of an intake port used to improve fluidity of intake air.

2. Description of the Prior Art

As generally known in the art, as a fluidity of a fuel-air mixture sucked in an engine increases, flame is easily propagated so that combustion performance of the engine is improved.

Recently, in order to increase the fluidity of the fuel-air mixture and thus to improve the combustion performance as described above, there is used a method in which air itself flows in a combustion chamber with strong rotation. In this case, a process is mainly used in which a shape of an intake port is controlled to form tumble flow.

FIG. 1 shows an air intake system of an engine for forming tumble flow according to the prior art. As shown in FIG. 1, the air intake system includes an air intake pipe 104 for inducting air into a combustion chamber 102, a bypass pipe 106 disposed in parallel with the air intake pipe 104, and a control valve 108 disposed within the air intake pipe 104 and serving to control flow of air through the air intake pipe 104.

In a mechanism for forming tumble flow in the combustion chamber 102 using the device shown in FIG. 1, flow of air through the air intake pipe 104 is controlled with the control valve 108. As a result, where air supplied through the bypass pipe 106 and air supplied through the air intake pipe 104 are different from each other in flow rate, a swirl is formed due to the different flow rate when air flows in the combustion chamber 102. Whether tumble flow is formed or not, the amount of the formed tumble flow and the like varies depending on an opening degree of the control valve.

However, since the variable tumble-generating device constructed and operated as described above must have the bypass pipe 106 separate from the prior air intake pipe 104, it has a problem of its installation space in relation with other parts and a problem of complexity of manufacture.

Furthermore, the separate bypass pipe 106 must include a plurality of bent portions in view of its structure. Owing to such bent portions, a large flow resistance is generated in air flowing through the inside of the bypass pipe 106, so that the bent portions act as a cause of a decrease in flow rate of the flowing air. For this reason, the bypass pipe is a little disadvantageous to achieve its original object for creating tumble by forming a flow of air of high flow rate using its narrow section area and creating a flow rate different from air flowing through the air intake pipe.

SUMMARY OF THE INVENTION

Accordingly, the present invention has been made to solve the above-mentioned problems occurring in the prior art, and an object of the present invention is to provide a variable tumble flow-generating device, which can generate tumble flow by making air flowing through different passages while minimizing a flow resistance of air supplied into a combustion chamber, and which has a simple structure so that a limitation in its installation space in relation with other parts can be avoid, and also which can be manufactured in an easy manner.

It is another object of the present invention to provide a manufacturing method of a variable tumble flow-generating intake port for use in the variable tumble flow-generating device.

To accomplish these objects, there is provided a variable tumble flow-generating device, which comprises: a bulkhead for dividing an intake port into a first passage and a second passage; an opening degree control valve for selectively changing an opening degree of the first and second passages; and driving means for operating the opening degree control valve.

Furthermore, according to the present invention, there is provided a manufacturing method of a variable tumble flow-generating intake port, which comprises the steps of: preparing an upper mold in which a space for forming a first passage of an intake port is provided; preparing a lower mold in which a space for forming a second passage of the intake port is provided; forming a stepped portion being capable of assembling with a metal plate, at a portion where the upper and lower molds are assembled with each other; assembling the metal plate serving as a bulkhead, with the stepped portion; assembling the upper mold with the lower mold and filling a molding sand into the resulting mold assembly; disassembling the mold assembly so as to release an intake port core integrated with the metal plate; assembling and casting the intake port core with a mold for casting a cylinder head; and removing the casting sand from the intake port core so that the metal plate serving as the bulkhead remains in the intake port.

BRIEF DESCRIPTION OF THE DRAWINGS

The above and other objects, features and advantages of the present invention will be more apparent from the following detailed description taken in conjunction with the accompanying drawings, in which:

FIG. 7 is a drawing for illustrating various plane shapes of the bulkhead of FIG. 2;

DETAILED DESCRIPTION OF THE PREFERRED EMBODIMENTS

Figure 1:
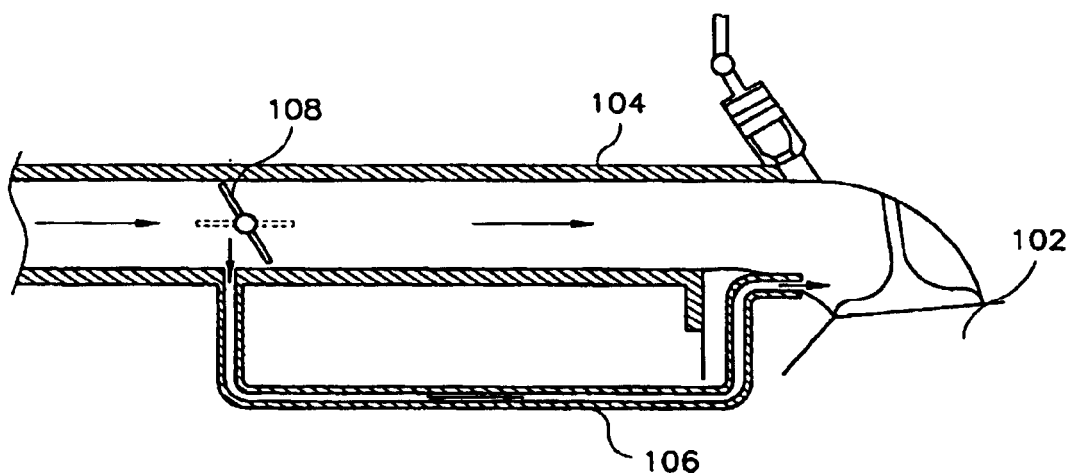
FIG. 1 is a drawing showing a tumble flow-generating air intake system of an engine according to the prior art.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 2:
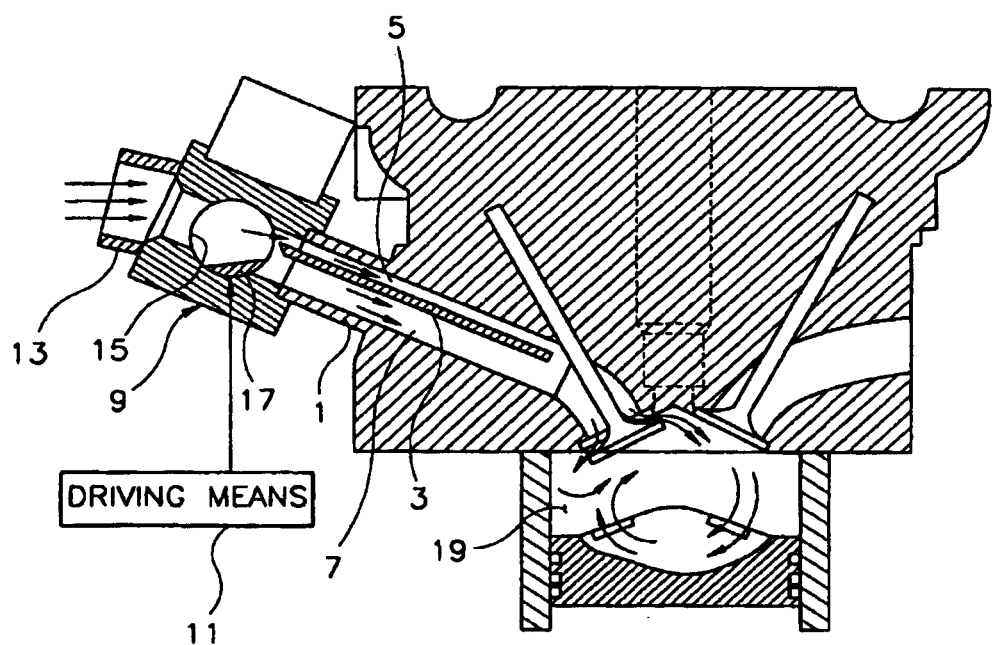
FIG. 2 is a drawing showing a structure of a variable tumble flow-generating device according to the present invention.

FIG. 2 shows a variable tumble-generating device of an engine according to the present invention. As shown in FIG. 2, an intake port 1 includes a bulkhead 3 serving to divide the intake port 3 into a first passage 5 and a second passage 7 through which air flows. At the air inlet side of the bulkhead 3, an opening control valve 9 is disposed which serves to selectively change an opening degree of the first and second passages 5 and 7. To the opening control valve 9 is connected to a driving means for operating and controlling the opening control valve 9.

In this case, the opening control valve 9 has a communicating space 15 which is provided between an air intake pipe 13 and the intake port 1. In the communicating space 15, a valve spool 17 having a semicircular cross-section shape is placed which inscribes the communicating space 15. As a result, by rotation of the valve spool 17, the opening degree of the first and second passages 5 and 7 can be changed.

It can be understood that the driving means 11 is connected to the opening control valve 9 and controlled with ECU (not shown) of an engine, thereby adjusting the opening degree of the first and second passages 5 and 7. The driving means 11 can be selected as a stepping motor.

Meanwhile, the bulkhead 3 is disposed in the intake port 1 in such a manner that it inclines toward one side. For this reason, the first passage 5 and the second passage 7 are formed so as to have a depth. In this embodiment, the bulkhead 3 is formed so as to incline toward the upper side of the cross-section of the intake port 1, so that the first passage 5 has a shallow depth compared to the second passage 7. As a result, the first passage 5 is formed so as to have a small flow cross-section area compared to that of the second passage 7.

Accordingly, when air flows through the first and second passages 5 and 7 having the different flow cross-section area, a flow rate in the first passage 5 having a small flow cross-section area is high compared to that in the second passage 7. For this reason, by air passed through the first and second passages 5 and 7, tumble flow is naturally formed in a combustion chamber because of the flow rate difference between the first and second passages.

It can be understood that the strength of tumble flow is adjusted by changing the opening degree of the first and second passages 5 and 7, so that an optimal intake flow condition is realized according to the operation condition of the engine.

Figure 5:
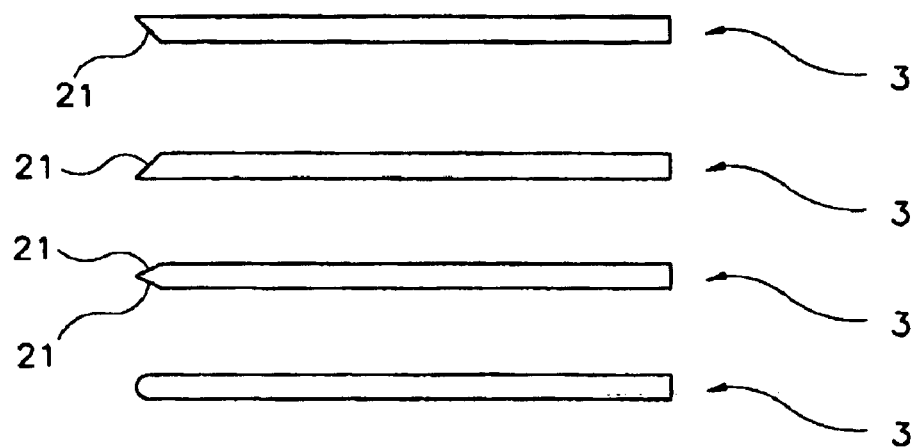
FIGS. 5 and 6 are drawings for illustrating various cross-section shapes of a bulkhead, which can be disposed in the variable tumble-generating device of FIG. 2.

Meanwhile, as shown in FIG. 5, an air inlet-facing end of the bulkhead 3 can be formed in various cross-section shapes, such as a shape of a slant surface 21 slanted at a desired angle, a shape formed by intersecting two of the slant surfaces 21 in an opposite direction, and a round shape, etc. For this reason, when air passed through the opening control valve 9 is divided by means of the bulkhead 3 and flows in the first and second passages 5 and 7, a flow resistance and separation of air can be minimized.

Figure 6:
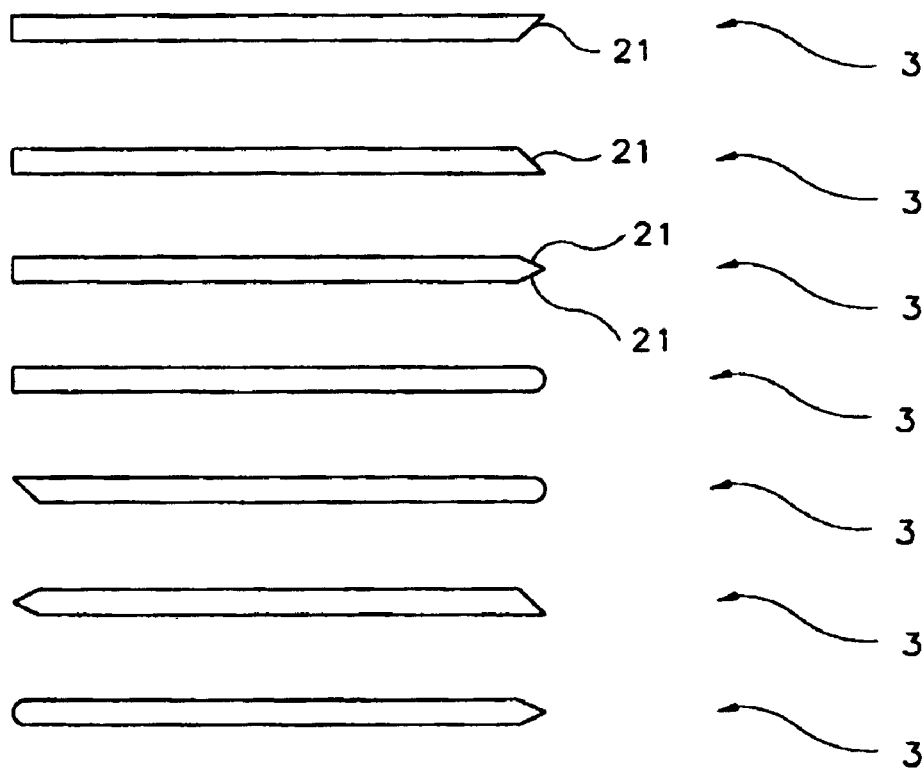

In addition, as shown in the upper side of FIG. 6, an air outlet-facing end of the bulkhead can be formed so as to have various cross-section shapes, a shape of a slant surface 21 slanted at a desired angle, a shape formed by intersecting two of the slant surfaces 21 in an opposite direction, and a round shape, etc. Furthermore, it can have shapes as shown in the underside of FIG. 6 in combination with the cross-section shapes shown in FIG. 5, so that a flow of air passing through the intake port 1 can be maintained at the optimum condition.

In addition to controlling the cross-section shape of the bulkhead 3 to order to affect a flow of air, as shown in FIG. 7, a air inlet-facing end of the bulkhead 3 is formed in a simple straight line shape, a shape having grooves 23 formed thereon, or a shape with rugged portions 25, so that a flow of air passing through the intake port to the combustion chamber 19 can be maintained at the optimum condition.

At the highest side of FIG. 7, a flat plate is showed which is in a state not subjected to a separate processing. In addition, a shape having working grooves 27 for insurance of a working space for tools upon assembling of a valve guide, a shape additionally having the grooves 23, and a shape additionally having the rugged portions 25, are successively showed. All of these shapes are shapes of a bulkhead used in a DOHC engine having two intake valves at one cylinder.

Figure 3:
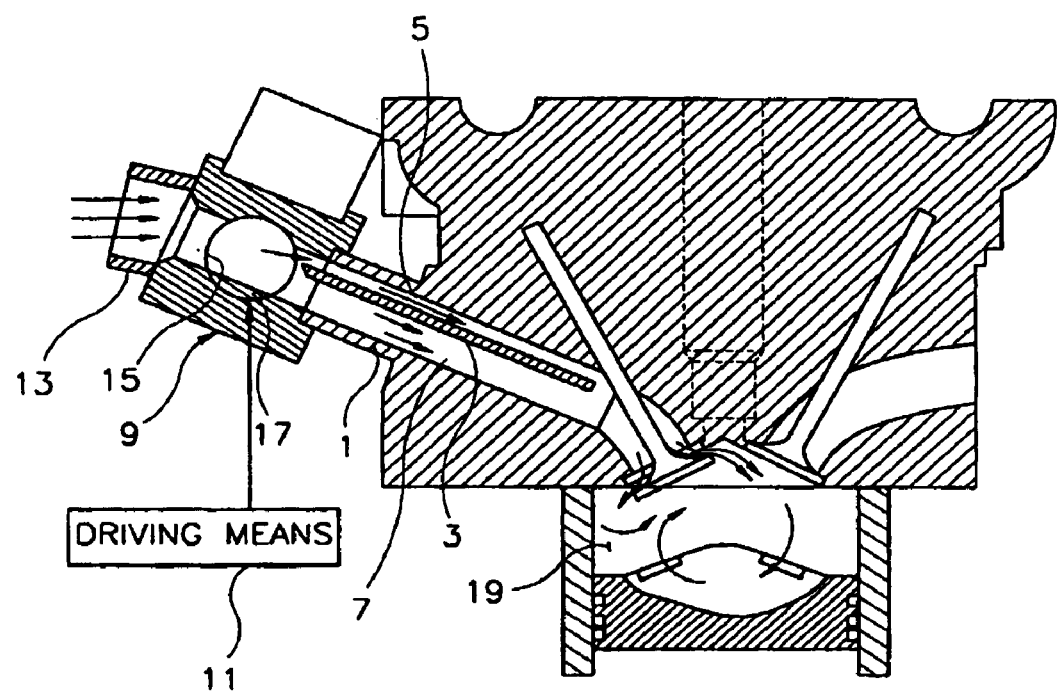
FIG. 3 is a drawing showing a state where the variable tumble flow-generating device of FIG. 2 is operated at a high loading.
Figure 4:
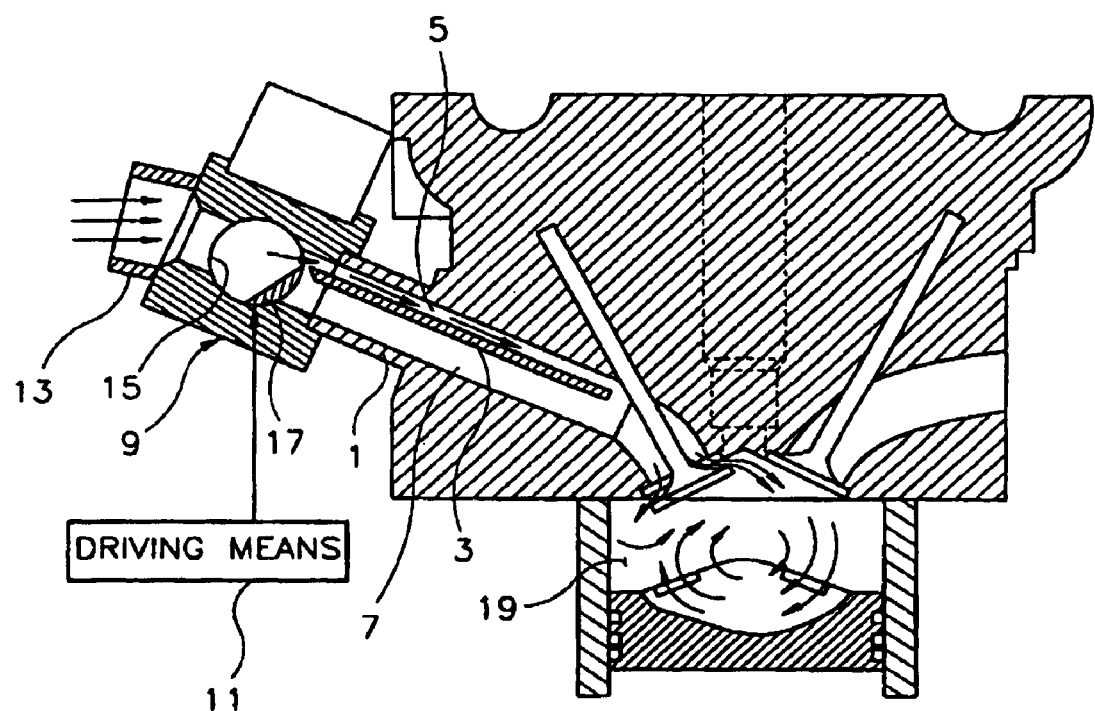
FIG. 4 is a drawing showing a state where the variable tumble flow-generating device of FIG. 2 is operated at a partial loading.

FIGS. 3 and 4 schematically illustrate operation of the variable tumble flow-generating device according to the present invention. FIG. 3 shows a control state with priority given to an intake efficiency of the engine. In this state, by the opening control valve 9, all of the first and second passages 5 and 7 are completely opened at an engine operation condition of high loading, such that a sufficient amount of air required in the combustion chamber 19 is supplied at an engine operation condition of high loading while tumble flow is a little formed by the flow rate difference between air passing through the first passage 5 and air passing through the second passage 7.

FIG. 4 shows a control state with priority given to a combustion efficiency of the engine. In this state, by the opening control valve 9, the second passage 7 is closed at a partial loading state, such as constant speed running, racing and low speed running, such that air is supplied only into the first passage 5. Thus, strong tumble flow is formed in the combustion chamber so that a small amount of a fuel-air mixture is sufficiently combusted.

It can be understood that the opening control valve can be controlled in various conditions depending on various operation conditions of the engine, in addition to the conditions as shown in FIGS. 3 and 4.

Accordingly, in the engine having the structure and operation as described above, the optimal engine control can be achieved so as to be suitable for an operation condition corresponding to the high loading and partial loading states, so that output performance and fuel ratio of the engine can be all satisfied.

Hereinafter, a manufacturing method of a variable tumble-generating intake port for use in the variable tumble-generating device as described above will be described.

Figure 8:
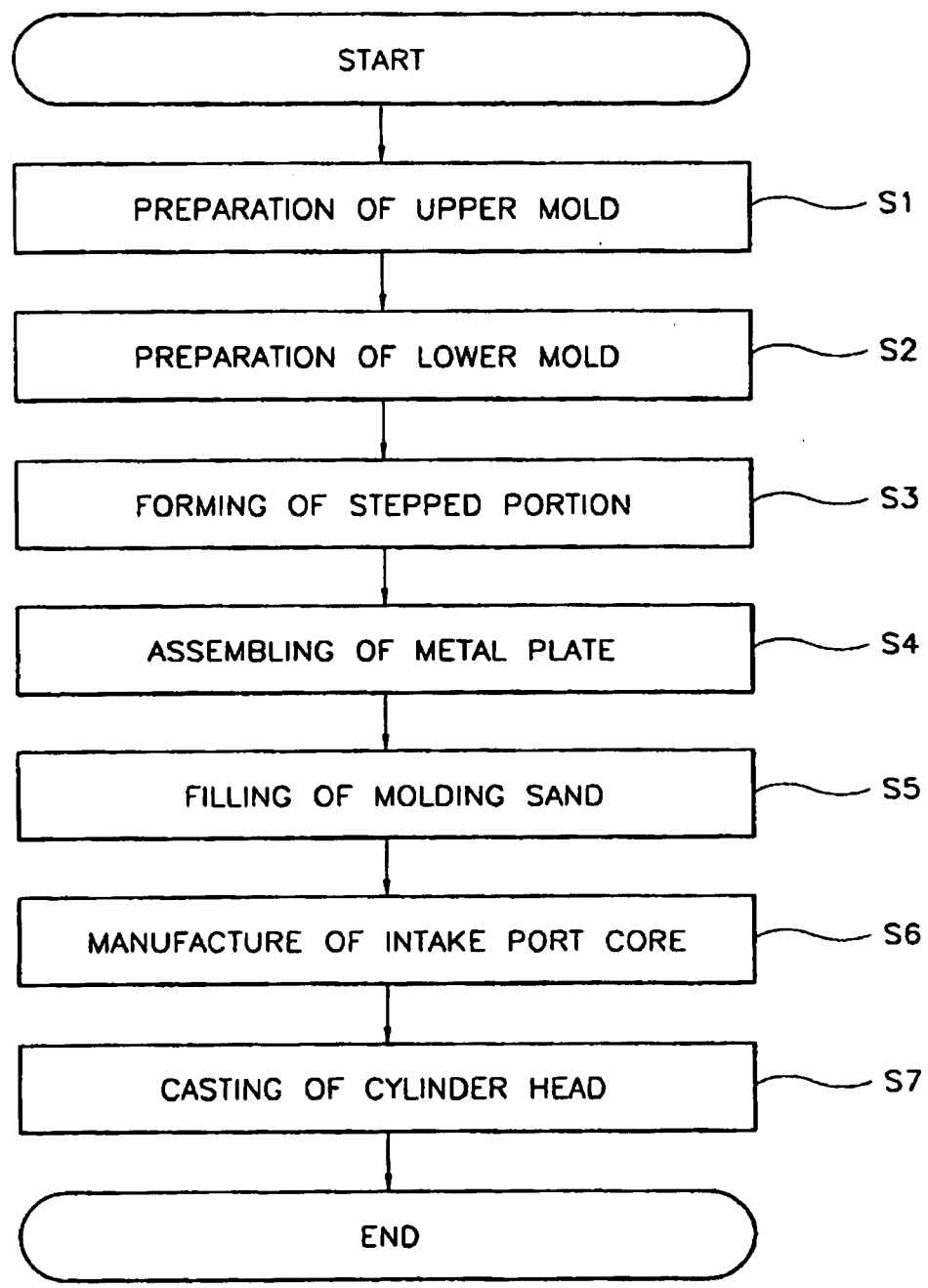
FIG. 8 is a flow chart showing a manufacturing method of a variable tumble flow-generating intake port according to the present invention.

In manufacturing the variable tumble flow-generating device as described above, the most important and strict matter is to dispose the bulkhead as described above within the intake port. Hereinafter, a method of forming the bulkhead 3 in the intake port 1 will be described with reference to FIG. 8.

The bulkhead 3 must be disposed at a preciously selected location in a limited space provided within the intake port 1, and a shape of the bulkhead 3 is also an important factor affecting a flow pattern of air, so that the bulkhead 3 needs to be preciously processed.

As a result, in order to satisfy the necessities as described above, the present invention provides the intake port-forming method, in which the bulkhead is previously inserted into an intake port core used in forming the intake port upon casting of a cylinder head of an engine, so that the bulkhead 3 can be not only processed so as to have a desired precious shape, but also can be installed at a precious position within the intake port 1 of the engine.

Namely, the present invention provides an intake port-forming method comprising an upper mold-preparing step S1 in which an upper mold 50 having a space for forming a first passage 5 of an intake port 1 is prepared; a lower mold-preparing step S2 in which a lower mold 52 having a space for forming a second passage 7 of the intake port 1 is prepared; a stepped portion-forming step S3 in which a stepped portion 54 being capable of assembling with a metal plate 3 is formed at a portion where the upper and lower molds 50 and 52 are assembled with each other; a metal plate-assembling step S4 in which the metal plate 3 serving as a bulkhead is assembled with the stepped portion 54; a molding sand-filling step S5 in which the upper mold is assembled with the lower mold, and a molding sand 56 is filled into the resulting mold assembly; a core-manufacturing step S6 in which the mold assembly is disassembled so as to release an intake port core 58 integrated with the metal plate 3; and a cylinder head-casting step S7 in which the intake port core 58 is assembled with a mold for casting a cylinder head, and the molding sand is removed from the intake port core such that the metal plate 3 serving as the bulkhead remains in the intake port 1.

Figure 9:
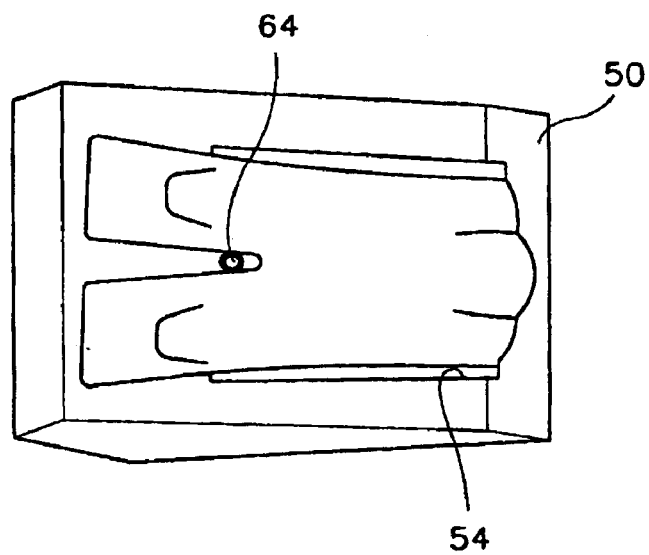
FIG. 9 is a drawing showing an upper mold resulted from an upper mold-preparing step.
Figure 10:
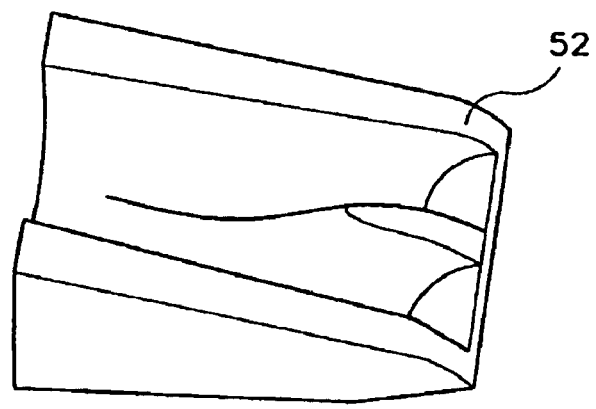
FIG. 10 is a drawing showing a lower mold resulted from a lower mold-preparing step.

It can be understood that the order of the upper mold-preparing step (S1; FIG. 9) and the lower mold-preparing step (S2; FIG. 2) is unimportant. Also, a shape of a space to be formed within the intake port 1 is divided into the first passage 5 and the second passage 7 that are formed at the upper mold 50 and the lower mold 52, respectively. In addition, the first passage 5 and the second passage 7 are formed so as to have the different cross-section area.

The stepped portion-forming step is a step classified for easy description, but it can be practically carried out in such a manner that the stepped portion is formed together with the first and second passages 5 and 7 when preparing the upper and lower molds 50 and 52. In FIG. 9, although there is showed that the stepped portion is formed only at the upper mold 52 in a groove shape, it can be formed in various manners.

Namely, the stepped portion is formed at a portion where the upper mold 50 and the lower mold 52 are assembled with each other. In this case, as shown in FIG. 13a to 13e, the stepped portion can be formed in various manners as described below:

1) The stepped portion is formed at the upper mold 50 and the lower mold 52, respectively, in a groove shape, such that a center in a thick-wise direction of the metal plate 3 is placed on the mold separation line P/L between the upper and lower molds.

2) The stepped portion is formed at the upper mold 50 in a groove shape, such that a lower mold-facing surface of the metal plate 3 is located on the mold separation line P/L between the upper and lower line P/L.

3) The stepped portion is formed at the lower mold 50 in a groove shape, such that an upper mold-facing surface of the metal plate 3 is placed on the mold separation line P/L between the upper and lower line P/L.

4) The stepped portion is formed at the upper mold 50 in a groove shape and formed at the lower mold in a protrusion shape.

5) The stepped portion is formed at the upper mold 50 in a protrusion shape and formed at the lower mold in a groove shape.

Figure 14:
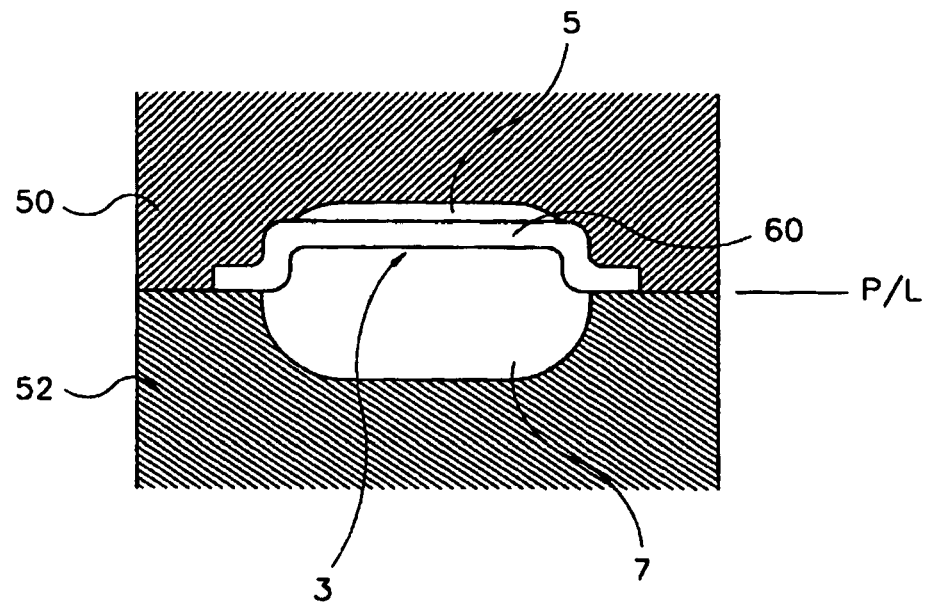
FIG. 14 is a drawing showing the metal plate between the upper and lower mold.

In addition, in the metal plate-assembling step, the metal plate 3 as the bulkhead is inserted between the upper mold and the lower mold. In this case, a bent portion 60 is formed at the metal plate 3 as shown in FIG. 14, so that the first passage 5 and the second passage 7 can be formed so as to have the different cross-section area by the bent portion 60.

If necessary, the bulkhead 3 can be processed such that it can be installed with a desired rotation angle, not installed perpendicularly to the upper and lower direction of the intake port. As a result, by air entering the combustion chamber, swirl flow can be formed in addition to tumble flow.

Figure 11:
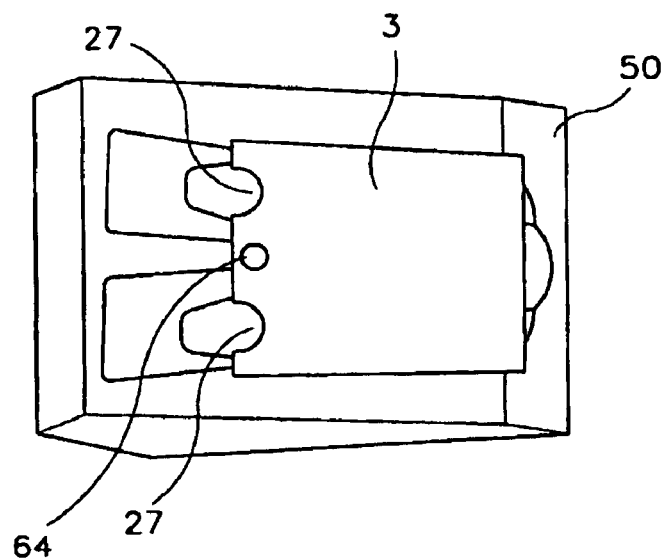
FIG. 11 is a drawing for describing a metal plate-assembling step in which a metal plate is assembled with the upper mold.

With the stepped portion 54 formed as described above, the metal plate 3 is assembled as shown in FIG. 11. At the metal plate 3, a positioning hole 62 is formed as shown in FIG. 7, and a positioning protrusion 64 to be inserted into the positioning hole 62 is further formed at the upper mold-preparing step S1 as shown in FIG. 9. As a result, the metal plate 3 can be rapidly positioned upon its assembling, so that an assembling operation of the metal plate 3 can be easily carried out.

Meanwhile, the metal plate 3 assembled in the metal plate-assembling step S4 is made of a material having a higher melting point than that of a base metal forming the cylinder head, such that it is not dissolved in a base metal melt which is introduced upon casting of the cylinder head.

Figure 12:
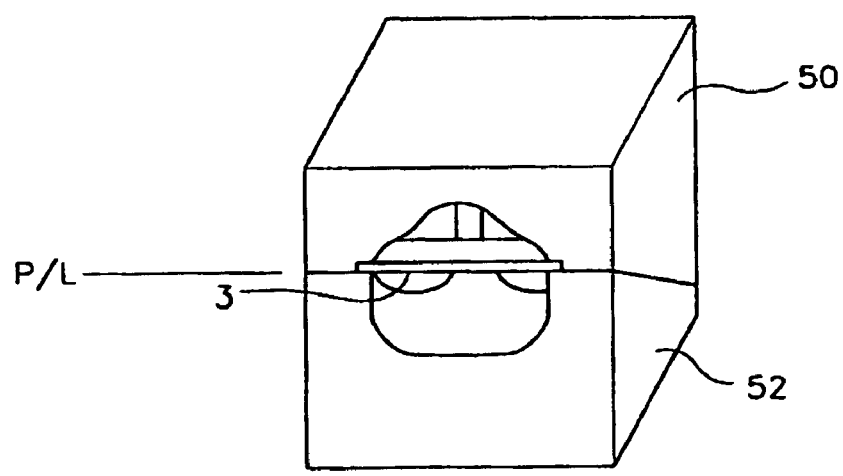
FIG. 12 is a drawing showing a core mold assembly in which the upper mold and the lower mold are assembled with each other.
Figure 13A:
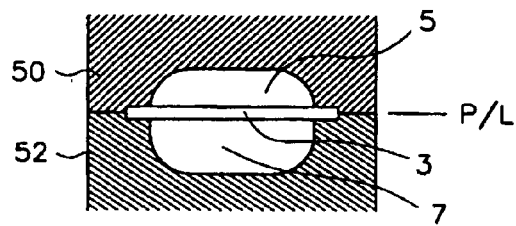
FIGS. 13a to 13e are drawings various states where the metal plate is disposed in the core mold.
Figure 13B:
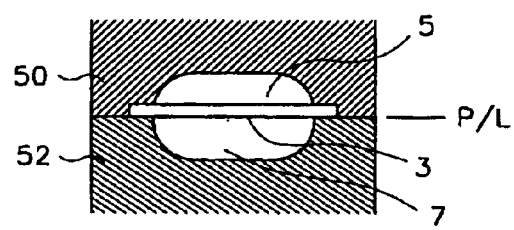
Figure 13C:
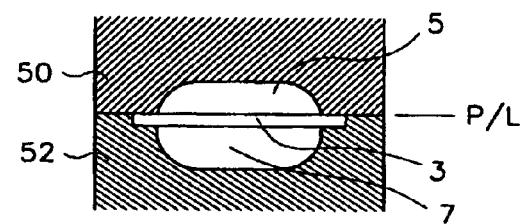
Figure 13D:
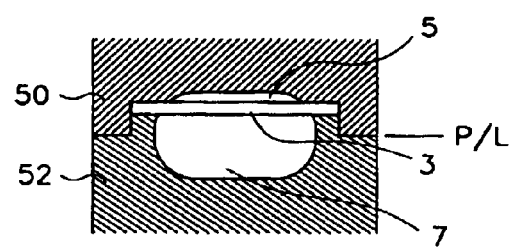
Figure 13E:
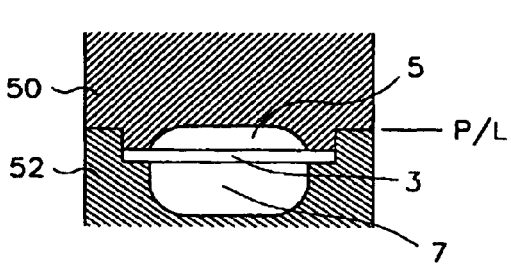
Figure 15:
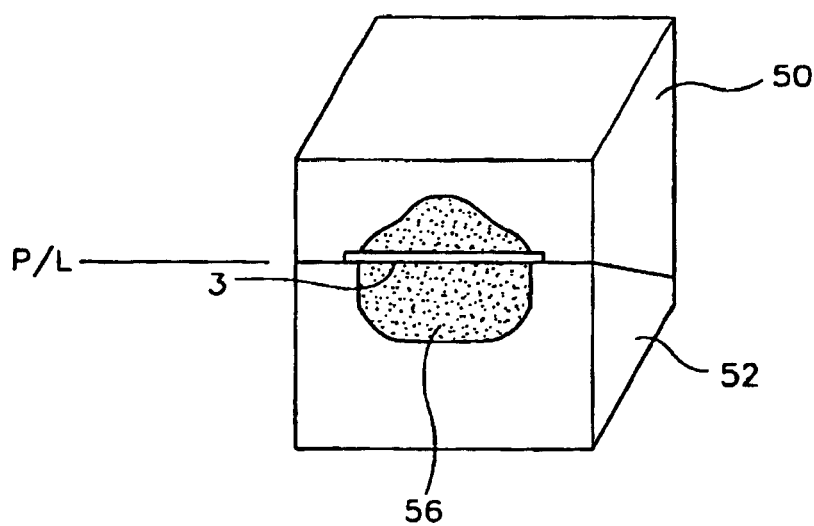
FIG. 15 is a drawing showing a state where a molding sand is filled in the core mold.
Figure 16:
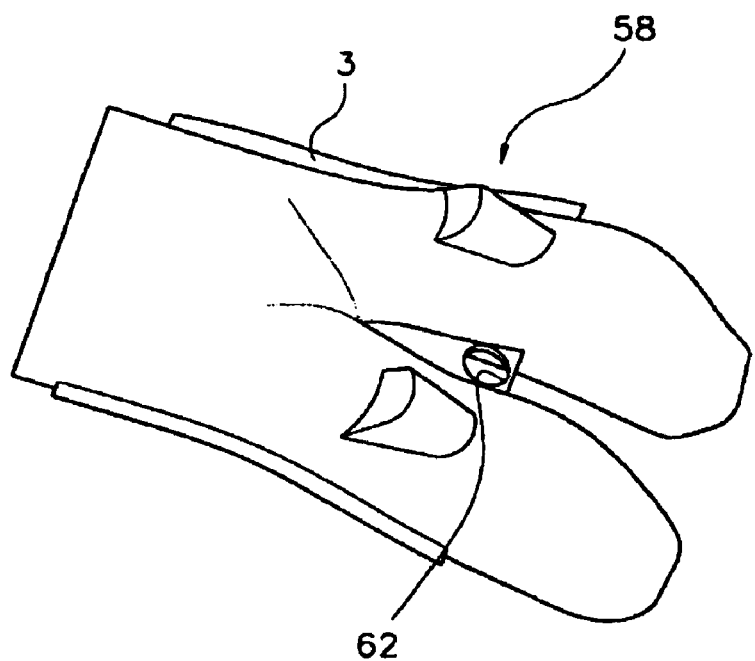
FIG. 16 is a perspective view of an intake port core obtained after separation of the core mold from the state of FIG. 15.

The resulting mold assembly structure in which the metal plate is inserted between the upper mold and the lower mold is showed in FIG. 12. Such a mold assembly structure is then filled with a casting sand 56 as shown in FIG. 15. As the casting sand sets, the upper mold and the lower mold are separated from each other, thereby preparing an intake port core 58 integral with the metal plate 3 serving as the bulkhead, as shown FIG. 16.

The intake port core 58 prepared as described above is assembled with a mold used for casting of the cylinder head. After casting of the cylinder head, where the casting sand 56 is removed from the intake port core, the metal plate 3 remains as the bulkhead in the intake port 1.

At this case, the positioning hole 62 which was formed for easy assembling of the metal plate 3 with the upper mold remains at the metal plate 3 integral with the intake port core 58. As the base metal melt forming the cylinder head is introduced and sets in the positioning hole 62, the metal plate 3 is securely fixed to the intake port of the cylinder head.

As apparent from the foregoing, the present invention provides the variable tumble flow-generating device, which can generate tumble flow by making air flowing through different passages while minimizing a flow resistance of air supplied into the combustion chamber, and which has a simple structure so that a limitation in its installation space in relation with to other parts can be avoid. Also, the variable tumble flow-generating device according to the present invention is manufactured by adding a structure where the bulkhead is previously formed in the intake port core. For this reason, this is a simple structure and thus is manufactured at inexpensive costs.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A manufacturing method of a variable tumble flow-generating intake port, which comprises the steps of:

preparing an upper mold in which a space for forming a first passage of an intake port is provided;

preparing a lower mold in which a space for forming a second passage of the intake port is provided;

forming a stepped portion being capable of assembling with a metal plate, at a portion where the upper and lower molds are assembled with each other;

assembling the metal plate serving as a bulkhead, with the stepped portion;

assembling the upper mold with the lower mold and filling a molding sand into the resulting mold assembly;

disassembling the mold disassembly so as to release an intake port core integral with the metal plate; and assembling and casting the intake port core with a mold in which a cylinder head is cast, and removing the casting sand from the intake port core such that the metal plate serving as the bulkhead remains in the intake port.

2. The manufacturing method of a variable tumble flow-generating intake port according to claim 1, in which the first passage and the second passage are formed so as to have a different cross-section area, in the upper mold-preparing step and the lower mold-preparing step, respectively.

3. The manufacturing method of a variable tumble flow-generating intake port according to claim 1, in which the metal plate assembled in the metal plate-assembling step has a bent portion, so that the first passage and the second passage are formed so as to a different cross-section area by the bent portion.

4. The manufacturing method of a variable tumble flow-generating intake port according to claim 1, in which the stepped portion in the stepped portion-forming step is formed at the upper mold and the lower mold, respectively, in a groove shape, so that a center in a thick-wise direction of the metal plate is located on a mold separation line between the upper mold and the lower mold.

5. The manufacturing method of a variable tumble flow-generating intake port according to claim 1, in which the stepped portion in the stepped portion-forming step is formed at the upper mold in a groove shape, so that a lower mold-facing surface of the metal plate is located on a mold separation line between the upper mold and the lower mold.

6. The manufacturing method of a variable tumble flow-generating intake port according to claim 1, in which the stepped portion in the stepped portion-forming step is formed at the lower mold in a groove shape, so that a upper mold-facing surface of the metal plate is located on a mold separation line between the upper mold and the lower mold.

7. The manufacturing method of a variable tumble flow-generating intake port according to claim 1, in which the stepped portion is formed at the upper mold in a groove shape and formed at the lower mold in a protrusion shape.

8. The manufacturing method of a variable tumble flow-generating intake port according to claim 1, in which the stepped portion is formed at the upper mold in a protrusion shape and formed at the lower mold in a groove shape.

9. The manufacturing method of a variable tumble flow-generating intake port according to claim 1, in which a positioning hole is formed at the metal plate assembled in the metal plate-assembling step, and a protrusion to be inserted into the positioning hole is formed in the upper mold-preparing step.

10. The manufacturing method of a variable tumble flow-generating intake port according to claim 1, in which the metal plate assembled in the metal plate-assembling step is made of a material having a higher melting point than that of a base metal for forming the cylinder head.

\* \* \* \* \*